Jan. 8, 1946.    H. R. ANNIS    2,392,446
ILLUMINATION CONTROL SYSTEM
Original Filed Feb. 3, 1939    2 Sheets—Sheet 1

WITNESS:

INVENTOR
Howard R. Annis
BY
ATTORNEYS.

Jan. 8, 1946.          H. R. ANNIS          2,392,446
ILLUMINATION CONTROL SYSTEM
Original Filed Feb. 3, 1939          2 Sheets-Sheet 2

WITNESS:

INVENTOR
Howard R. Annis
BY
Busser & Harding
ATTORNEYS.

Patented Jan. 8, 1946

2,392,446

UNITED STATES PATENT OFFICE 2,392,446

ILLUMINATION CONTROL SYSTEM

Howard Russell Annis, Auburn, Maine

Application April 5, 1941, Serial No. 386,993

22 Claims. (Cl. 315—83)

This invention relates to an illumination control system particularly adapted for the automatic dimming of the headlights used on a motor vehicle, by means of the lights of an approaching vehicle.

This application is, in part, a continuation of my application Serial No. 257,987, filed February 23, 1939.

The broad object of the present invention is the provision of means for the automatic dimming of the lights of one vehicle by the approach of the lights of another vehicle. In accordance with the invention, the lights on the vehicle having the controlled system are dimmed as soon as illumination of sufficient intensity reaches a photocell carried by the vehicle, and the lights then remain dimmed until, by manual operation, for example, by a foot switch, the bright lights are restored by the operator of the vehicle.

A further object of the present invention is to provide an improved system of the type just described by providing for the automatic reestablishment of the bright illumination when the approaching vehicle passes the one carrying the controlled lights if there is no other vehicle approaching capable of maintaining the lights in dimmed condition.

In the following description, reference will be made to bright and dim lights or illumination with the understanding that these terms are to be construed from the standpoint of an observer approaching on the proper side of the highway. Various systems are now, and have been, in common use for producing the effect of bright or dim illumination on the approaching side of the road. In some cases, separate filaments of different candle power are provided. In others, the dimness or brightness is only apparent by reason of the direction of the beams of the lamps even though the various filaments used may have the same actual brightness. In still other case, it may be possible that dim filaments are continuously lighted and that bright illumination is obtained by the light of different additional filaments. It will be evident from the following description that the invention is equally applicable to any such systems, and the description will be so understood.

The above broad objects of the invention and other objects particularly relating to details of construction, the use of gas-type tubes for control purposes, and the provision of proper and ready control under all conditions will become apparent from the following description, read in conjunction with the accompanying drawings, in which.

In all of the arrangements herein described, the high voltages required for the proper operation of a photocell or amplifying or gas-type tubes is provided by the conventional type of high voltage power supply commonly used at the present time in connection with automobile radios. Such an arrangement comprises a vibrator-transformer and suitable filter circuits for supplying direct voltages of the order of 100 or more volts. Since such power supplies are quite conventional, they are not illustrated in detail, but will be understood as supplying the voltages to the terminals hereafter referred to. As also pointed out hereafter, they are supplied with battery or generator power through the same switches which render the lighting systems operative.

Figure 1:
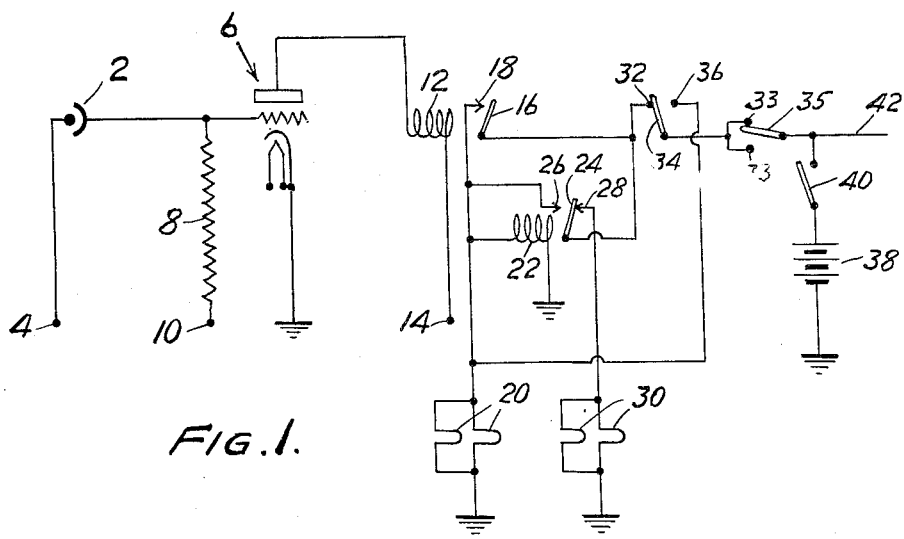
Figure 1 is a wiring diagram showing one embodiment of the invention utilizing mechanically operating relays for control purposes.

Referring first to Figure 1, there is illustrated therein an arrangement involving mechanical type relays comprising a photocell 2 adapted to be located in any convenient position on a vehicle so as to be subject to the illumination from an oncoming vehicle. This photocell may be provided inside the windshield or outside the body of the car near one of the headlamps. Desirably, it is shielded against illumination from above by road lamps and from other illumination from the sides which might result from store or similar lighting.

The anode of the photocell 2 is connected to a positive high voltage tap on the power supply indicated at 4, while its cathode is connected to the grid of an amplifying vacuum tube 6, and, through a high grid leak resistance 8 to tap 10 of the power supply, which would usually be negative with respect to the grounded cathode of the tube 6 so as to limit the plate current of the tube supplied from a high voltage positive tap 14 through a relay coil 12. Until the photocell is subjected to a predetermined amount of illumination, the grid of the amplifying vacuum tube 6 (which may be of any suitable type, for example, triode or pentode) maintains the plate current below a value sufficient to cause the relay 12 to attract its armature 16 and make contact between the armature and contact point 18. The contact point 18 of the relay is connected to the ungrounded side of the dim filaments 20 of the headlamps. As previously explained, the dim condition may be achieved in various ways, and this and the other circuits would be modified accordingly, but for simplicity of description, it will be assumed that there are separate dim filaments 20 and bright filaments 30, one of each being provided in each of two headlamps.

Connected also between the contact 18 and ground is a second relay coil 22, adapted to attract an armature 24, which moves between contact points 26 and 28, being normally maintained by spring action in engagement with the latter, which is connected to the ungrounded side of the bright filaments 30. The contact point 26 is electrically connected with the contact point 18. The armature 24 is connected with one contact 32 of the manually operable switch 34. This contact 32 is also connected to the armature 16 mentioned above. The alternate contact 36 of this switch is connected to the ungrounded side of the dim filaments 20.

The switch 34 is connected to a pair of contacts 33 of a switch 35 and thence through a main light controlling switch 40 to the ungrounded side of the low voltage supply of the vehicle illustrated as the battery 38. It will, of course, be understood that the usual generator supplies the low voltage rather than the battery of the vehicle when the vehicle is in operation. The battery illustrated in this and other figures is, therefore, to be regarded as the low voltage supply system considered as a whole. The lead indicated at 42 is the one connected to the high voltage power supply above mentioned. It will be evident that the switch 40 accordingly controls the entire operation of the system. The heater of the vacuum tube, if of proper voltage rating, may be supplied directly from the line 42.

The switches 34 and 35 may take various mechanical forms. Their object is to provide, in effect, a switch adapted to close the circuit alternately through contacts 32 and 36 but also capable of manual manipulation to produce momentary opening of the circuit. The more conventional type of dimming switch used at the present time is of snap type in which successive depressions of a button produce alternate contacts by a snap action making it impossible to open the circuit stably without effecting a change of contacts. In the present instance momentary opening of the circuit without effecting a change is desirable. Hence, assuming switch 34 to be of the ordinary snap type, the auxiliary switch 35 is provided to effect a momentary opening of the circuit without effecting a change. This switch may be operated by a separate button but is more desirably incorporated in the snap switch actuating button so as to be opened by preliminary play before the button moves sufficiently to effect a change. The arrangement is desirably also as illustrated so that continued application of pressure to switch 35 will result in continued closure of the circuit; i. e., unless the operator intentionally very carefully depresses the operating button, to break one contact 33 but avoid engagement of the other contact 33, no more than a momentary opening of the circuit will result.

By provision of a snap switch permitting circuit opening before change and without effecting change it is, of course, possible to use only a single switch.

The operation of the system of Figure 1 may now be described. Assuming that the switch 40 is in its closed position, voltages will be applied to the various terminals, and, in view of the position of the switch 34 in contact with 32, the bright filaments 30 of the vehicle will be illuminated through engagement of armature 24 with contact point 28. All lines leading to the dim filaments 20 will be open, as indicated. This condition will continue so long as there is not sufficient illumination of the photocell to cause dimming of the lights.

If, now, bright illumination is applied to the photocell by the headlights of an oncoming car, as soon as a sufficient intensity is reached, the current of tube 6 will increase to a point at which the armature 16 will be attracted by the relay. As soon as this occurs, it will be evident that voltage will be applied to the dim filaments 20 through the contact occurring between 16 and 18. Simultaneously, voltage is applied to the coil 22 of the second relay, causing it to attract its armature 24, breaking contact at 28 and making contact at 26. Thus it will be evident that the bright filaments 30 are deenergized and, at the same time, a parallel energization of the dim filaments 20 and of the relay coil 22 occurs through the contact of armature 24 and contact point 26. If, now, the illumination on the photocell decreases so that the plate current is reduced to a point at which the coil 12 is incapable of holding the armature 16, even though the armature 16 is released to disengage the contact 18, the dim filaments and the coil 22 will remain energized. By reason of this condition, the relay 22 is of a self-locking type.

The very important practical advantages of this arrangement are that there is no flickering of the controlled lights due to variations in the illumination on the photocell, even though rapid variations of illumination may cause chattering of the armature 16. As soon as the armature 16 makes even momentary contact at 18, the self-locking relay 22 comes into action, wiping out any effect of subsequent variations. Thus, once dimming occurs, it continues until manual intervention takes place.

Assuming that the source of illumination has passed and that the photocell is now insufficiently illuminated to effect dimming, a slight movement of the switch 35 sufficient to break contact at 33 momentarily, but insufficient to make contact at 36 (if switches 35 and 34 are interconnected mechanically as above described) will produce a break in the circuit including the armature 24 and contact 26, and accordingly the dim filaments 20 and the relay coil 22 are deenergized so that the armature 24 is permitted to drop against the contact 28. If contact between 34 and 32 has continued, as soon as contact between 35 and either contact 33 is remade, the bright filaments are again energized. Another momentary break possibly made in releasing switch 35 is of such short duration as not to make any appreciable flicker in the light from the bright filaments.

The above was described on the assumption that the illumination on the photocell was insufficient to produce dimming. If during such manipulation of the foot switch 35, the photocell was subject to bright illumination, the armature 16 will have been in contact with contact point 18. Accordingly, therefore, as soon as switch 35 reengages a contact 33 after a momentary disengagement, the dim filaments and the relay 22 will be energized, with the result that the dim filaments will be illuminated.

While the above description implies the possibility of a transient failure of illumination of either set of filaments, and the possible transient illumination of the bright set, it will be evident from the practical standpoint that neither of these events occurs. Both the relays are desirably of a quick acting type attracting and releasing their armatures in a very small fraction of a second. The switch 35 will be open only momentarily and will immediately reclose, it being practically impossible for an operator to hold it open in a moving car. The heat capacity of the lamp filaments commonly used in headlights is quite considerable, so that it takes an appreciable fraction of a second for the filaments both to become bright and to lose their brightness. Consequently, in normal operation, as described, the bright filaments do not perceptibly glow, nor does continuous illumination by the dim filaments noticeably cease in case the photocell is subject to sufficient illumination to cause dimming. On the other hand, if it is not subject to dimming illumination, the deenergization of the dim filaments and the energization of the bright filament occur in such rapid sequence that continuous illumination of the highway is provided.

It will be evident from the above, therefore, that the system will operate without flickering of the headlamps and with smooth transition from bright to dim condition, or the reverse in automatic reversal and restoration. Insurance is also had against bright illumination being restored by the operator even intentionally so long as illumination of a degree causing dimming occurs on the photocell.

If, for example, in city driving, it is desired to use the dim filaments only, the switch 34 is placed in contact with point 36, by which action the bright filaments are taken completely out of the circuit. If the switches 34 and 35 are interconnected as described above, the momentary openings of switch 35 have no substantial result in effecting even a momentary flickering of the illumination. While the dim filaments are illuminated, the automatic dimming devices may still operate to energize the relay 12, but the operations will be without effect. Since the current involved in maintaining the automatic dimming devices in operation is small, it is immaterial whether or not they are operating.

Figure 2:
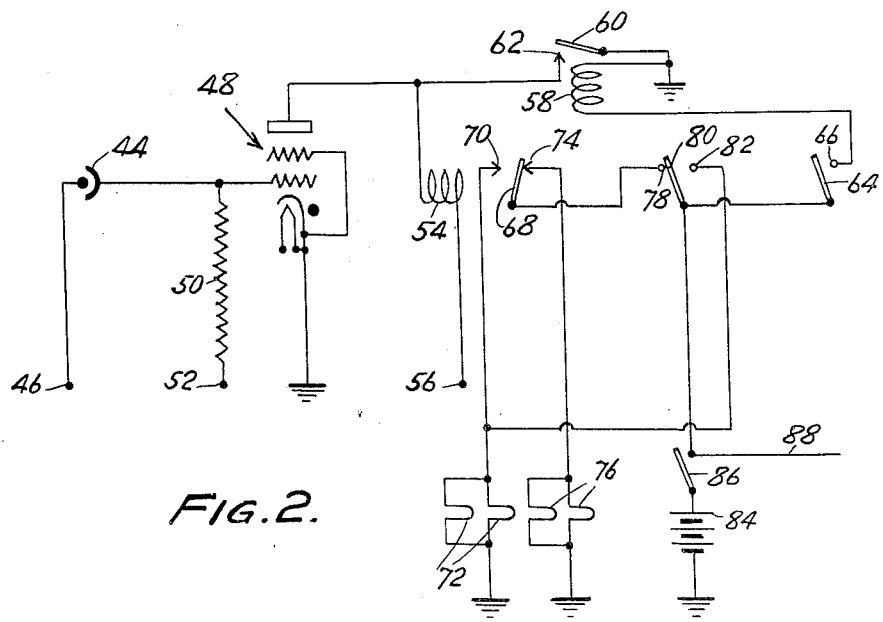
Figure 2 is a similar diagram, but showing the use of a gas-type tube as a relay.

The arrangement illustrated in Figure 1 requires a relay 12 having a very large number of turns in its coil for operation under the slight changes of current produced in the amplifying tube 6 by the changes of illumination of the photocell. The relay 22, of course, is relatively inexpensive, since it may utilize fairly heavy current from the low voltage supply 38. In Figure 2, advantage is taken of the characteristics of a gas-filled type of tube to permit the use of relatively inexpensive relays in the circuit. In this modification of Figure 2, a photocell 44 similar to photocell 2, has its anode connected to a positive high voltage tap 46, and has its cathode connected to a load resistor 50 connected to a negative biasing cap 52 and to the grid of a gas-type relay tube indicated at 48. A tube suitable for use at this point is, for example, RCA 2050 or 2051 of hot cathode gas-filled type. As compared with vacuum tubes, it is a characteristic of such gas-filled tubes that substantially no current passes between the plate and cathode until the grid potential rises to a certain point. Thereupon ionization and discharge occurs which is no longer subject to control by the grid. The currents upon such discharge may be of the order of 50 to 100 milliamperes and are, of course, capable of operating relatively inexpensive relays. Such a relay is indicated at 54, a positive voltage being applied to the plate of the tube 48 through it from the positive high voltage tap 56.

The plate of the tube 48 is connected to a contact point 62 adapted to be engaged by the grounded armature 60 of a relay 58 one end of the coil of which is grounded while the other end is connected to a contact point 66 engageable by a manually operable, normally open, switch 64.

The relay 54 is provided with an armature 68 movable between contact points 70 and 74 connected respectively to the dim filaments 72 and the bright filaments 76. The armature 68 is connected to a contact point 78 of a manually operable switch 80, which has a second alternate contact point 82 connected to the ungrounded side of the dim filaments 72. The switches 80 and 64 are connected together and through a switch 86 to the low voltage supply conventionalized as a battery 84. The line 88, also subject to the control of the switch 86, leads to the high voltage power supply and the heater of the tube 48. In the case of the use of the gas-filled tube 48, a time delay device, for example, of thermal type is preferably incorporated in the power supply circuit to insure that the cathode of the tube is brought up to operating temperature before the high voltage is supplied. This is conventional in the use of such tubes to avoid destructive bombardment of the cathode by ions of the gas.

The switches 64 and 80 may be independently operable or may be interconnected in the same general fashion as described above in connection with the switches 34 and 35. The switch 80 is preferably of the snap type successive applications of pressure to the operating button of which will effect change between the points 78 and 82. The switch 64 may be incorporated in the operating button so as to be closed by a slight amount of play existing before a snap action of the switch 80 is effected. Thus a momentary tap on an actuating button may effect closing of the switch 64 to produce the result later described, while a stronger application of pressure will effect operation of the switch 80.

With the switch 86 closed and the tube 48 energized and switch 80 in the position illustrated, the parts will occupy the position shown if the illumination on the photocell 44 is insufficient to produce automatic dimming. The bright filaments 76 will be energized through the switch 80 and through the contact of armature 68 with point 74.

If, now, sufficient illumination impinges on the cell 44 to raise the potential of the grid of the tube 48 to a sufficient extent to produce discharge, the tube will break down and the plate current will flow to a degree determined by the constants of the circuit. No appreciable plate current will have been flowing prior to this time, and since a plate current of the order of 50 to 100 milliamperes may now be flowing, a relatively insensitive relay may be used at 54, the armature 68 of which will be attracted to make contact at 70, thereby deenergizing the bright filaments and energizing the dim filaments.

In view of the characteristic of a gas tube to maintain its discharge after break down irrespective of the grid potential, the tube provides in itself a self-locking relay action. Consequently, even though the bright illumination on the photocell may be immediately removed, the relay 54 remains energized. Consequently, as in the modification of Figure 1, a completely stable action takes place, effecting the change from the bright to dim illumination without any flickering and maintaining the illumination of the dim filaments.

The restoration of the bright illumination may be effected by stopping the discharge of the tube. This can be most readily accomplished by bringing the plate of the tube to the cathode potential. To secure this result, the switch 64 may be momentarily closed at 66 to energize the relay 58, thereby grounding the plate of the tube through contact point 62 and armature 60. A relay is desirably used at this point because it is generally undesirable to carry a high voltage lead such as that connected at the point 62 to a remote position, for example in the floor board of an automobile. With proper insulating precautions, a relay is, of course, unnecessary, and the armature 60 may be replaced by a manual switch.

The grounding of the plate deionizes the tube. During the ocurrence of such grounding, however, the relay 54 remains energized because of its connection between the high voltage point 56 and ground through the armature 60. Consequently, the making of contact between 64 and 66 does not produce an immediate shift to the bright illumination. If the illumination on the photocell has dropped to such extent that the grid of the tube 48 is no longer at a sufficiently high potential to effect break down, the release of the switch 64 will cause release of the armature 60 and consequent deenergization of the relay 54, so that the bright illumination will be restored. However, if upon release of switch 64 the grid of tube 48 had a break-down potential by reason of illumination on the photocell 44, then, as soon as switch 64 is opened and armature 60 opens, break-down will occur, with the result that the relay 54 will continue energized. Thus, despite manual intervention, the bright illumination cannot be maintained if the photocell is sufficiently illuminated by oncoming headlights.

As in the case of the previous modification, the shift of switch 80 to make contact at 82 will effect continued illumination of the dim headlights.

In the case of the modifications so far described, the restoration of the bright illumination after removal of illumination from the photocell is effected manually. It is, of course, possible, though not so desirable, to effect automatic return through some timing arrangement which, after dimming, will try to restore the bright illumination automatically after a predetermined time by momentary closure of a switch equivalent to either 35 of Figure 1 or 64 of Figure 2. It is more desirable, however, and considerably simpler, to effect such restoration automatically by taking advantage of the fact that usually an oncoming headlight which will produce dimming will be passed by the vehicle subject to control and, just prior to such passing, the photocell will be subjected to very intense illumination. Advantage is taken of this condition to effect automatic restoration of the bright illumination after the dimming vehicle has passed, provided some other dimming light is not present, due, for example, to a subsequent vehicle. Usually, automatic restoration of the bright lights will thus take place, but in the event that the vehicle producing dimming turns off the road or, for some other reason, the restoring intensity is not attained, the restoring may then be accomplished manually in a fashion similar to those involved in the operation of the preceding modifications. At any rate, by automatic arrangements manual restoration is made necessary only in relatively few instances.

Figure 3:
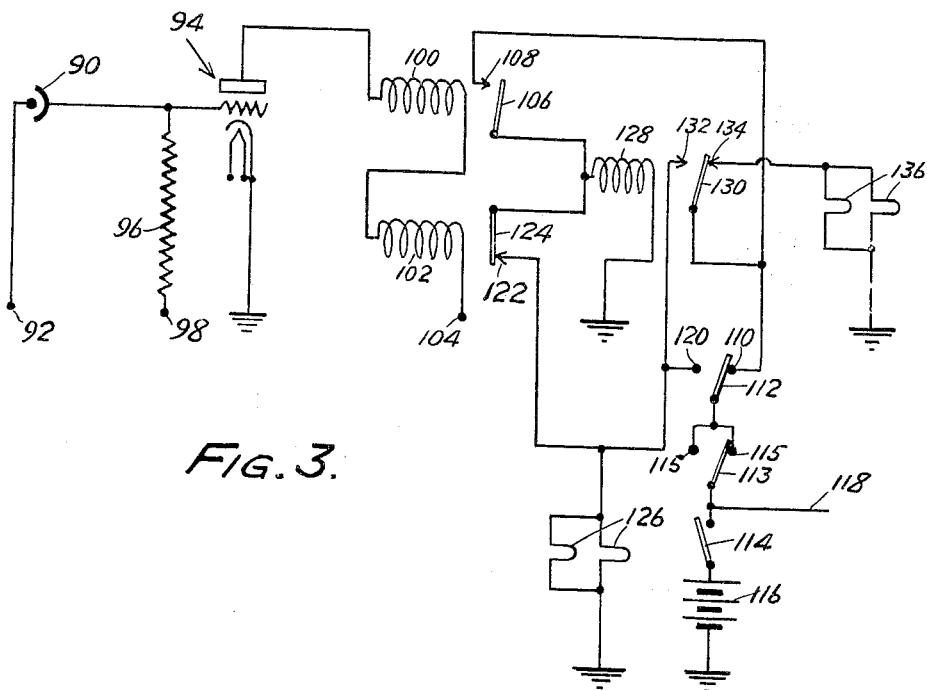
Figure 3 is a further similar diagram showing what is, in effect, a modification of the arrangement of Figure 1 to provide for the automatic restoration of bright lights upon the passage of an oncoming vehicle.

In Figure 3 there is illustrated an automatic modification involving solely mechanical relays and representing a modification of the circuit of Figure 1. As in the case of Figure 1, a photocell 90 has a positive voltage applied to its anode from the terminal 92 and is connected to the load or grid leak resistance 96 and to the grid of the vacuum tube 94. The terminal 98 supplies a proper biasing voltage to the grid of the tube.

In the plate circuit of the tube are two relays 100 and 102, respectively, arranged in series between the plate and the high voltage terminal 104. The relay 100 has an armature 106 adapted to be attracted into contact with the point 108, which is connected to the switch point 110 of the snap switch 112 corresponding to 34 previously described. This, in turn, is connected to the contact points 115 of the switch 113 corresponding to switch 35 of the modification of Figure 1. These switches are desirably of the types described above, and may be similarly mechanically interconnected. The switch 113 is connected through the main switch 114 to the low voltage supply source 116. The line 118 leads to the power supply for the dimming device.

The alternate contact 120 of the switch 112 is connected to the ungrounded side of the dim filaments 126 and is also connected to the contact point 122 of the armature 124 of the relay 122. The armatures 106 and 124 are connected together and to one terminal of a third relay 128, the other terminal of which is grounded. The relay 128 is provided with an armature 130, electrically connected to the point 108 and contact 110 and adapted to move between contact points 132 and 134 toward the latter of which it is urged by a suitable spring. Contact point 132 is electrically connected to contact 120, while contact point 134 is electrically connected to the ungrounded side of the bright filaments, 136.

In normal operation to effect bright illumination, the switch 114 is closed and manual switch 112 is in the position illustrated, while the armatures of the various relays are located as shown, armature 124 being normally maintained in contact at 122 by a suitable spring. The relays 100 and 102 are so adjusted (by adjustment of contact points and spring tensions) so that relay 100 requires substantially less current to attract its armature than relay 102. On the other hand, after the respective relay coils are energized, the relay 100 will drop its armature at a higher current value than the relay 102. In other words, as current increases, relay 100 will pick up its armature and subsequently relay 102 will pick up its armature. On the other hand, as the current then decreases, relay 100 will drop its armature to be followed by relay 102. With this arrangement in mind, the operation of effecting the dimming and automatic return may now be described.

As soon as a sufficient intensity of illumination occurs on the photocell 90 to raise the plate current to a value to cause the relay 100 to attract armature 106, contact will be made at 108, with the result that current will be supplied from 110, through contact armature 106 to relay 128 and also through armature 124 to the dim filaments 126. The energization of relay 128 will immediately cause it to attract its armature 130 to break contact at 134, deenergizing the bright filaments and to make contact at 132 effecting an energization of the dim filaments and the relay 128 in parallel with the energization of these effected through armature 106. Accordingly, even if relay 100 is immediately deenergized, both the dim filaments and relay 128 will remain energized. Thus there occurs a locking action similar to that of Figure 1 to prevent any flickering or instability in the system. The situation thus arising is maintained until the illumination on the photocell 90 rises to a sufficient extent, for example, upon close approach of the vehicle which effected dimming, to raise the plate current to a sufficient value to cause relay 102 to pick up its armature 124. This will, of course, break contact at 122. The illumination sufficient to energize relay 102 will, of course, also be sufficient to energize relay 100, and consequently armature 106 will make contact at this time with contact point 108 serving to maintain relay 128 energized through the electrical path from 110 and armature 106. The dim filaments 126 will remain energized through the armature 130 and contact 132.

As the bright illumination occasioned by the oncoming headlights wanes during passage of the vehicle, the plate current will now drop and, as stated above, armature 106 will be dropped by relay 100 before armature 124 is dropped by relay 102. As soon as the relay 100 drops its armature 106, relay 128 will be deenergized, since the alternative energizing circuit through armature 124 will now be open. Consequently, armature 130 will engage point 134 to restore the bright illumination, while at the same time the circuit of the dim filaments will be opened. When, even momentarily thereafter, relay 102 drops its armature, no result occurs, since the armature 106 will be opened. Thus bright illumination is restored by reason of the intense illumination occurring during the passing.

It will be noted that this action can occur only, if, at the time passing occurs, there is no other source sufficient to effect dimming. If there is such a source, the restoration of the bright illumination will be delayed until the second or any subsequent source passes. Thus there can be no restoration of the bright illumination at an improper time.

In the event that after dimming has been effected the illumination does not rise to a value sufficient to energize the relay 102, a momentary opening of the circuit at 113 will produce a restoration of the bright illumination by deenergizing the relay 128, maintaining it deenergized provided the relay 100 is not holding its armature. Thus manual restoration of bright illumination is effected in substantially the same fashion as occurs in the modification of Figure 1.

Continuous dim illumination may be provided by locating switch 112 in contact with point 120.

A modification of the circuit of Figure 2 may also be provided to effect automatic restoration of bright illumination. Such a modification is illustrated in Figure 4.

In this case, the photocell 138 having its anode connected to a high voltage supply 140 and having its cathode connected to a load resistor 144, biased at 146, is connected to the grid of the gas tube 142 in the same fashion as in Figure 2. The plate of the gas tube is connected through a relay coil 150 to the high voltage supply 152 and is also connected to the contact point 156 adapted to be engaged by the grounded armature 154 of a relay provided with a coil 158 connected to a switch point 162 engageable by a normally open switch 160 corresponding to switch 64 of the modification of Figure 2. The switch 160 is connected to the low voltage supply 164 through the main switch 166, which also controls the energization of the power supply through the lead 168. The parts so far described have their counterparts in the modification of Figure 2, as will be obvious.

The armature 170 of the relay 150, normally open, is adapted to engage the contact point 172 connected to a high voltage terminal 174, which may or may not be identical with 152, depending upon the suitable voltages for the tubes used. The armature 170 is connected to a second coil 176 on the relay having the armature 154, and this second coil has its other end connected to the plate of a vacuum tube 148, the cathode of which is grounded. The relay 150 is provided with a second armature 178 normally engaging a contact 184 connected to the ungrounded side of the bright filaments 186 and adapted to be attracted by the relay into engagement with contact 180 connected to the ungrounded side of the dim filaments 182. The armature 178 is connected with one pole 188 of a switch 190, the other pole 192 of which is connected to the ungrounded side of the dim filaments 182. The switch 190 is connected through switch 166 with the low voltage source 164. The switches 190 and 160 may correspond, respectively, to the switches 80 and 64 of Figure 2 and may be similarly mechanically interconnected or, if desired, independent.

Figure 4:
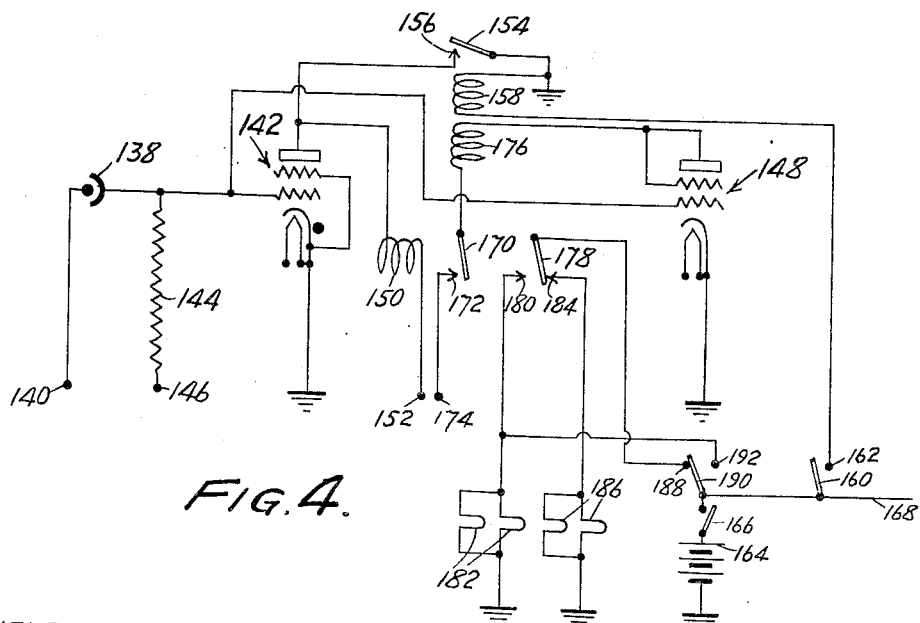
Figure 4 is a somewhat similar diagram showing the use of a gas-type tube in a circuit also capable of restoring the bright illumination automatically.

In the operation of the arrangement of Figure 4, the switch 190 is normally in engagement with contact 188 if bright illumination is desired. Switch 160 does not engage contact 162 except when manual restoration is desired, as in the modification of Figure 2. The armatures 154, 170 and 178 are in the respective positions illustrated. When there is insufficient illumination on the photocell 138 to effect a change, the output 142 will not have broken down and the bias on the grid of tube 148 will be sufficient to maintain its plate current at such low value as not to cause the coil 176 to attract armature 154 even after plate voltage is applied by closure of armature 170.

As soon as sufficiently intense illumination falls on photocell 138 to break down the tube 142, the plate current will immediately flow, energizing the relay 150 and attracting both armatures 170 and 178. The attraction of armature 170 will effect application of high voltage to the plate of tube 148, but, as indicated above, with illumination only sufficient to produce dimming, the bias on the grid of this tube will maintain the plate current at a value insufficient to effect closure of contact at 156. The attraction of armature 178 will break the connection to the bright filaments and make the connection to the dim filaments 182, thus effecting dim illumination. After the tube 142 has broken down as just indicated, its grid will not gain control even though the source of illumination may be removed. Consequently, the circuit will be locked in the condition last described.

As the approaching vehicle comes nearer and is about to pass, the voltage of the grid of the tube 148 will increase in a positive sense with resulting increase in plate current until eventually the coil 176 will attract armature 154, grounding the plate of the gas tube 142 and stopping the discharge. It will be noted, however, that current will continue to flow through the relay 150 from the high voltage source to ground, maintaining the armatures 170 and 178 in their attracted positions.

The relay 176 is of such type as not to drop its armature 154 until the current through it drops to a substantially lower value than that determined by a potential of the grid corresponding to the potential of the grid of the gas tube, which would produce break-down. As a consequence, as the bright source of illumination passes, and the connected grids of the tubes become more negative, the current through the coil 176 will ultimately decrease to such extent as to release the armature 154. When this occurs, the high supply voltage will be immediately applied to the plate of tube 142, but its grid will now be sufficiently negative to prevent discharge. Consequently, current flow through the coil 150 will cease, and armatures 170 and 178 will be dropped to effect restoration of the bright illumination. It will be noted that after the passage of the intense illumination, such restoration will not occur until the illumination on the photocell drops to a sufficient extent not to cause ionization of the tube 142. Thus the bright illumination will not be restored if there are approaching cars subsequent to the one which effected closure of armature 154. It will be noted that armature 170 is not absolutely necessary, but it may be conveniently applied in connection with relay 150 to reduce the current drain on the power supply, since the relay 150 is necessary in any event to attract the armature 178.

If for some reason the intense illumination necessary to provide illumination of the bright light does not occur, manual restoration may be effected by closing the circuit through relay 158 momentarily at 160 to effect the same type of action as that occurring in the case of the modification of Figure 2.

Continued use of the dim filaments may be provided by moving switch 190 into contact at 192.

It may be remarked that in the various embodiments, the main switches, indicated at 34, 80 and 112 and 190, may be arranged to control the supply of high voltage to the tubes only when set for bright illumination. In such cases, however, the heaters of the tubes, and particularly of gas tubes, should be connected to the low voltage supply source continuously, so that the tubes will be ready for substantially immediate operation.

It will be evident from the above description that various modifications in the described circuits may be made without departing from the scope of the invention.

What I claim and desire to protect by Letters Patent is:

1. In combination with an electrical lighting circuit selectively variable to provide either dim or bright illumination, means for automatically controlling said circuit to interrupt the bright illumination and to provide dim illumination comprising relay means, photoelectric means responsive to a foreign source of illumination for operating said relay means, means responsive to strong illumination and its withdrawal for restoring the bright illumination, said relay means comprising holding means acting to prevent restoration of said bright illumination until affected by said restoring means, and connections by which the restoring means is rendered ineffective to restore the bright illumination by affecting said holding means until said foreign source has disappeared.

2. In combination with an electrical lighting circuit selectively variable to provide either dim or bright illumination, means for automatically controlling said circuit to interrupt the bright illumination and to provide dim illumination comprising relay means, photoelectric means responsive to a foreign source of illumination for operating said relay means, means responsive to strong illumination and its withdrawal for restoring the bright illumination, said relay means comprising holding means acting to prevent restoration of said bright illumination until affected by said restoring means, and connections by which the restoring means is rendered ineffective to restore the bright illumination by affecting said holding means until said foreign source has disappeared, said restoring means acting on said connections to interrupt temporarily a circuit through the holding means so that upon recompletion of such circuit the relay means provides bright illumination if the photoelectric means is not responding to a foreign source of illumination.

3. In combination with an electrical lighting circuit selectively variable to provide either dim or bright illumination, means for automatically controlling said circuit to interrupt the bright illumination and to provide dim illumination comprising relay means, photoelectric means responsive to a foreign source of illumination for operating said relay means, means responsive to strong illumination and its withdrawal for restoring the bright illumination, said relay means comprising holding means acting to prevent restoration of said bright illumination until affected by said restoring means, and connections by which the restoring means is rendered ineffective to restore the bright illumination by affecting said holding means until said foreign source has disappeared, said restoring means acting to render said holding means temporarily ineffective thereby to leave the control of the relay means solely to the photoelectric means.

4. In combination with an electrical lighting circuit selectively variable to provide either dim or bright illumination, means for automatically controlling said circuit to interrupt the bright illumination and to provide dim illumination comprising relay means, photoelectric means responsive to a foreign source of illumination for energizing said relay means, said relay means comprising an armature and associated connections providing a holding circuit through which the relay may maintain itself energized independently of said photoelectric means, and means responsive to strong illumination and its withdrawal for restoring the bright illumination, effective when said photoelectric means is not responsive to a foreign source of illumination, by interruption of the holding circuit.

5. In combination with an electrical lighting circuit selectively variable to provide either dim or bright illumination, means for automatically controlling said circuit comprising photoelectric means responsive to a foreign source of illumination for effecting interruption of the bright illumination and provision of the dim illumination, means for maintaining the dim illumination following initial response of said photoelectric means despite removal therefrom of illumination from the foreign source, and means responsive to a predetermined strong illumination of said photoelectric means for restoring the bright illumination upon removal of illumination from said photoelectric means.

6. In combination with an electrical lighting circuit selectively variable to provide either dim or bright illumination, means for automatically controlling said circuit comprising photoelectric means responsive to a foreign source of illumination for effecting interruption of the bright illumination and provision of the dim illumination, means for maintaining the dim illumination following initial response of said photoelectric means despite removal therefrom of illumination from the foreign source, and means rendered effective by a predetermined strong illumination of said photoelectric means for restoring the bright illumination.

7. In combination with an electrical lighting circuit selectively variable to provide either dim or bright illumination, means for automatically controlling said circuit comprising photoelectric means responsive to a foreign source of illumination for effecting interruption of the bright illumination and provision of the dim illumination, means for maintaining the dim illumination following initial response of said photoelectric means despite removal therefrom of illumination from the foreign source, and means responsive to a predetermined strong illumination of said photoelectric means for interrupting the action of said maintaining means thereby to effect automatic restoration of the bright illumination.

8. In combination with an electrical lighting circuit selectively variable to provide either dim or bright illumination, means for automatically controlling said circuit to interrupt the bright illumination and to provide dim illumination comprising relay means, photoelectric means responsive to a foreign source of illumination for operating said relay means, means for restoring the bright illumination, said relay means comprising holding means acting to prevent restoration of said bright illumination until affected by said restoring means, and connections by which the restoring means is rendered ineffective to restore the bright illumination by affecting said holding means until said foreign source has disappeared.

9. In combination with an electrical lighting circuit selectively variable to provide either dim or bright illumination, means for automatically controlling said circuit to interrupt the bright illumination and to provide dim illumination comprising relay means, photoelectric means responsive to a foreign source of illumination for operating said relay means, means for restoring the bright illumination, said relay means comprising holding means acting to prevent restoration of said bright illumination until affected by said restoring means, and connections by which the restoring means is rendered ineffective to restore the bright illumination by affecting said holding means until said foreign source has disappeared, said restoring means acting on said connections to interrupt temporarily a circuit through the holding means so that upon recompletion of such circuit the relay means provides bright illumination if the photoelectric means is not responding to a foreign source of illumination.

10. In combination with an electrical lighting circuit selectively variable to provide either dim or bright illumination, means for automatically controlling said circuit to interrupt the bright illumination and to provide dim illumination comprising relay means, photoelectric means responsive to a foreign source of illumination for operating said relay means, means for restoring the bright illumination, said relay means comprising holding means acting to prevent restoration of said bright illumination until affected by said restoring means, and connections by which the restoring means is rendered ineffective to restore the bright illumination by affecting said holding means until said foreign source has disappeared, said restoring means acting to render said holding means temporarily ineffective thereby to leave the control of the relay means solely to the photoelectric means.

11. In combination with an electrical lighting circuit selectively variable to provide either dim or bright illumination, means for automatically controlling said circuit to interrupt the bright illumination and to provide dim illumination comprising relay means, photoelectric means responsive to a foreign source of illumination for operating said relay means, manually operable means for restoring the bright illumination, said relay means comprising holding means acting to prevent restoration of said bright illumination until affected by said restoring means, and connections by which the restoring means is rendered ineffective to restore the bright illumination by affecting said holding means until said foreign source has disappeared.

12. In combination with an electrical lighting circuit selectively variable to provide either dim or bright illumination, means for automatically controlling said circuit to interrupt the bright illumination and to provide dim illumination comprising relay means, photoelectric means responsive to a foreign source of illumination for operating said relay means, manually operable means for restoring the bright illumination, said relay means comprising holding means acting to prevent restoration of said bright illumination until affected by said restoring means, and connections by which the restoring means is rendered ineffective to restore the bright illumination by affecting said holding means until said foreign source has disappeared, said restoring means acting on said connections to interrupt temporarily a circuit through the holding means so that upon recompletion of such circuit the relay means provides bright illumination if the photoelectric means is not responding to a foreign source of illumination.

13. In combination with an electrical lighting circuit selectively variable to provide either dim or bright illumination, means for automatically controlling said circuit to interrupt the bright illumination and to provide dim illumination comprising relay means, photoelectric means responsive to a foreign source of illumination for operating said relay means, manually operable means for restoring the bright illumination, said relay means comprising holding means acting to prevent restoration of said bright illumination until affected by said restoring means, and connections by which the restoring means is rendered ineffective to restore the bright illumination by affecting said holding means until said foreign source has disappeared, said restoring means acting to render said holding means temporarily ineffective thereby to leave the control of the relay means solely to the photoelectric means.

14. In combination with an electrical lighting circuit selectively variable to provide either dim or bright illumination, means for automatically controlling said circuit to interrupt the bright illumination and to provide dim illumination comprising relay means, photoelectric means responsive to a foreign source of illumination for energizing said relay means, said relay means comprising an armature and associated connections providing a holding circuit through which the relay may maintain itself energized independently of said photoelectric means, and means for restoring the bright illumination, effective when said photoelectric means is not responsive to a foreign source of illumination, by interruption of the holding circuit.

15. In combination with an electrical lighting circuit selectively variable to provide either dim or bright illumination, means for automatically controlling said circuit to interrupt the bright illumination and to provide dim illumination comprising relay means, photoelectric means responsive to a foreign source of illumination for energizing said relay means, said relay means comprising an armature and associated connections providing a holding circuit through which the relay may maintain itself energized independently of said photoelectric means, and means for restoring the bright illumination, effective when said photoelectric means is not responsive to a foreign source of illumination, by interruption of the holding circuit, said restoring means comprising a manually operable switch additionally operable to provide continuous dim illumination independently of responses of said photoelectric means.

16. In combination with an electrical circuit for providing both dim and brilliant electrical illumination, means for automatically selecting the dim illumination and retaining the dim illumination, comprising relay means and means responsive to a foreign source of illumination for operating said relay means, and means manually operated for restoring the bright illumination after the foreign source of illumination has disappeared.

17. In combination with an electrical circuit for providing both dim and brilliant electrical illumination, means for automatically selecting the dim illumination and retaining the dim illumination, comprising a plurality of relays, a light sensitive cell and means operative by the energization of said light sensitive cell for operating one of said relays and selecting means associating a second relay with said first relay for operating the same and retaining it in a fixed position when the first relay has operated and means controlled by the operation of said second relay for selecting said dim illumination, and means including said selecting means manually operative for freeing said relay from its fixed position only when said first relay becomes non-energized.

18. In combination with an electrical circuit for providing both dim and brilliant electrical illumination, means operable through a foreign source of illumination for selecting said dim illumination and means manually operable for restoring said brilliant illumination only when said source has disappeared.

19. In combination with an electrical circuit for providing both dim and brilliant electrical illumination, means manually operable for selecting either dim or brilliant illumination and means operable through a foreign light source for selecting or maintaining said dim illumination and means associated with said selecting means for permitting the brilliant illumination to be selected only when the foreign source of illumination has disappeared.

20. In combination with an electrical circuit for providing both dim and brilliant electrical illumination, a foot or hand switch for selecting either bright or dim illumination, a plurality of relays including a sensitive relay and power relay, means operative through a foreign source of light for energizing said sensitive relay for selecting said dim illumination, said means also energizing said power relay and maintaining said relay energized after said sensitive relay becomes deenergized for continuing to maintain dim illumination and means operable in combination with said foot or hand switch and said power relay whereby the system is restored to normal inoperative condition by momentarily breaking the power source.

21. In combination with an electrical lighting circuit selectively variable to provide either dim or bright illumination, means for automatically controlling said circuit comprising photoelectric means responsive to a foreign source of illumination for effecting interruption of the bright illumination and provision of the dim illumination, and means for maintaining the dim illumination following initial response of said photoelectric means despite removal therefrom of illumination from the foreign source.

22. In combination with an electrical lighting circuit selectively variable to provide either dim or bright illumination, means for automatically controlling said circuit comprising photoelectric means responsive to a foreign source of illumination for effecting interruption of the bright illumination and provision of the dim illumination, means for maintaining the dim illumination following initial response of said photoelectric means despite removal therefrom of illumination from the foreign source, means for restoring said bright illumination, and means for preventing restoration of the bright illumination by the last named means of the photoelectric means is substantially illuminated.

HOWARD RUSSELL ANNIS.